United States Patent
Funahashi et al.

(10) Patent No.: US 10,250,344 B2
(45) Date of Patent: Apr. 2, 2019

(54) BROADCAST OF AUDIO DATA BASED ON INPUT BROADCAST SIGNALS STORED DURING A DETECTED ANOMALY PERIOD BY LIGHTNING ENERGY

(71) Applicant: Kabushiki Kaisha Toshiba, Minato-ku, Tokyo (JP)

(72) Inventors: Yuuki Funahashi, Fuchu Tokyo (JP); Seiki Katayama, Inagi Tokyo (JP); Hideki Nagao, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/305,508

(22) PCT Filed: Dec. 26, 2014

(86) PCT No.: PCT/JP2014/084634
§ 371 (c)(1),
(2) Date: Oct. 20, 2016

(87) PCT Pub. No.: WO2015/162831
PCT Pub. Date: Oct. 29, 2015

(65) Prior Publication Data
US 2017/0041089 A1  Feb. 9, 2017

(30) Foreign Application Priority Data

Apr. 23, 2014  (JP) .................. 2014-089566

(51) Int. Cl.
*H04B 17/10* (2015.01)
*H04B 17/40* (2015.01)
(Continued)

(52) U.S. Cl.
CPC ............. *H04B 17/40* (2015.01); *H04H 20/02* (2013.01); *H04H 20/12* (2013.01)

(58) Field of Classification Search
CPC ...... H04B 17/40; H04B 17/10; H04B 17/101; H04B 17/0082; H04B 17/30;
(Continued)

(56) References Cited

U.S. PATENT DOCUMENTS 8,300,817 B2  10/2012 Ogawa et al.
8,680,384 B2  3/2014  Ishioka
(Continued)

FOREIGN PATENT DOCUMENTS

EP  2654225 A2  10/2013
JP  H09-162759 A  6/1997
(Continued)

OTHER PUBLICATIONS

International Search Report for PCT/JP2014/084634 dated Feb. 10, 2015.
(Continued)

*Primary Examiner* — Philip Sobutka
(74) *Attorney, Agent, or Firm* — Knobbe, Martens, Olson & Bear, LLP

(57) ABSTRACT

According to an embodiment, a broadcast continuation assistance device, includes a memory that stores broadcast audio data corresponding to input broadcast audio signals in a chronological order; and an output unit that reads, from the memory, based on an anomaly detection signal received from outside, the broadcast audio data corresponding to the broadcast audio signals that would have been broadcast during an anomaly detected period, and outputs the broadcast audio signals corresponding to the read broadcast audio data after an anomaly is resolved.

9 Claims, 5 Drawing Sheets

(51) Int. Cl.
*H04H 20/10* (2008.01)
*H04H 20/12* (2008.01)
*H04H 20/02* (2008.01)

(58) Field of Classification Search
CPC ...... H04B 17/209; H04H 20/02; H04H 20/10; H04H 20/103; H04H 20/12
USPC ............................ 455/3.01, 67.11, 67.13, 91
See application file for complete search history.

(56) References Cited

U.S. PATENT DOCUMENTS

| | | | |
|---|---|---|---|
| 9,184,700 B2 | 11/2015 | Funahashi et al. | |
| 2002/0110356 A1* | 8/2002 | Abe | G11B 5/0086 386/263 |
| 2005/0283809 A1 | 12/2005 | Kim | |
| 2007/0085525 A1* | 4/2007 | Jantunen | G01R 29/0842 324/72 |
| 2014/0375393 A1 | 12/2014 | Funahashi et al. | |
| 2015/0103954 A1 | 4/2015 | Funahashi et al. | |

FOREIGN PATENT DOCUMENTS

| | | |
|---|---|---|
| JP | 2004-040604 A | 2/2004 |
| JP | 2008-199435 A | 8/2008 |
| JP | 2012-056189 A | 3/2012 |
| JP | 2013-191997 A | 9/2013 |
| JP | 2014-013992 A | 1/2014 |
| JP | 2014-216663 A | 11/2014 |

OTHER PUBLICATIONS

Notification of Reasons for Refusal, for JP Patent Application No. 2014-089566, dated Nov. 12, 2015—5 pages.
Notification of Reasons for Refusal, for JP Patent Application No. 2014-089566, dated Feb. 19, 2016—3 pages.
Background Art Information, Toshiba.
Extended European Search Report issued in application No. 14889887.7 dated Aug. 28, 2017.

\* cited by examiner

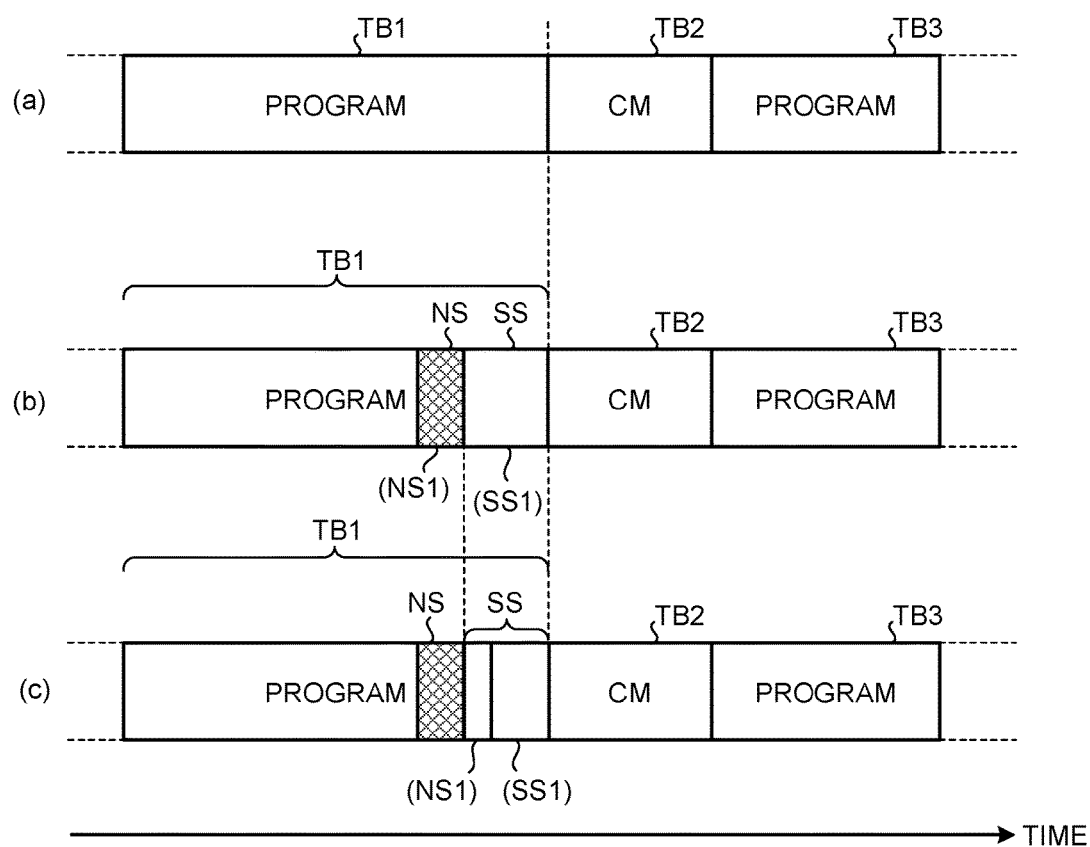

BROADCAST OF AUDIO DATA BASED ON INPUT BROADCAST SIGNALS STORED DURING A DETECTED ANOMALY PERIOD BY LIGHTNING ENERGY

CROSS-REFERENCE TO RELATED APPLICATIONS

This application is national stage application of International Application No. PCT/JP2014/084634, filed Dec. 26, 2014, which designates the United States, incorporated herein by reference, and which claims the benefit of priority from Japanese Patent Application No. 2014-089566, filed Apr. 23, 2014, the entire contents of which are incorporated herein by reference.

FIELD

Embodiments described herein relate generally to a broadcast continuation assistance device, and a control method for a broadcast continuation assistance device and a computer program product.

BACKGROUND

In medium wave radio broadcasting, broadcast audio signals (radio program) are produced in a studio with studio equipment and transmitted to a transmitting station with a transmitter via a relay device. In the transmitting station, AM waves are generated with the transmitter and sent to a certain broadcast service area.

Meanwhile, transmitters adopt control technique for blocking AM wave outputs for a short period of time in case of occurrence of anomaly such as stroke of lightning and release thunder energy to the ground (grounding), for example.

This is intended to prevent destruction of a transmitter (especially an amplifier) by the thunder energy. AM wave outputs are blocked for a short period of time for the purpose of blocking continuation of a load short circuit state (follow current) generated by the thunder energy.

For example, Patent Literatures propose a technique to monitor a standing wave ratio (SWR) or discharge light and to block AM wave outputs for a short period of time.

As described above, conventional transmitters include a mechanism to block AM wave outputs for a short period of time upon occurrence of anomaly such as a stroke of lightning to protect the transmitters. However, short-time blocking of AM wave outputs may cause silent time in broadcast audio signals received by a receiver and thus interruption of sound for example, which may result in auditorily undesirable broadcasting.

The embodiments has been devised in consideration to the above. An object thereof is to provide a broadcast continuation assistance device, and a control method for a broadcast continuation assistance device and computer program product which can mitigate the influence of a silent state on a listener even when the silent state occurs (short-time blocking of AM wave outputs) upon occurrence of anomaly.

BRIEF DESCRIPTION OF DRAWINGS

FIG. 7 is explanatory diagrams of relation between a program broadcasting period and a commercial broadcasting period according to the embodiment.

DETAILED DESCRIPTION

According to an embodiment, a broadcast continuation assistance device, comprises: a memory that stores broadcast audio data corresponding to input broadcast audio signals in a chronological order; and an output unit that reads, from the memory, based on an anomaly detection signal received from outside, the broadcast audio data corresponding to the broadcast audio signals that would have been broadcast during an anomaly detected period, and outputs the broadcast audio signals corresponding to the read broadcast audio data after an anomaly is resolved.

Hereinafter, embodiments will be described with reference to the drawings.

Figure 1:
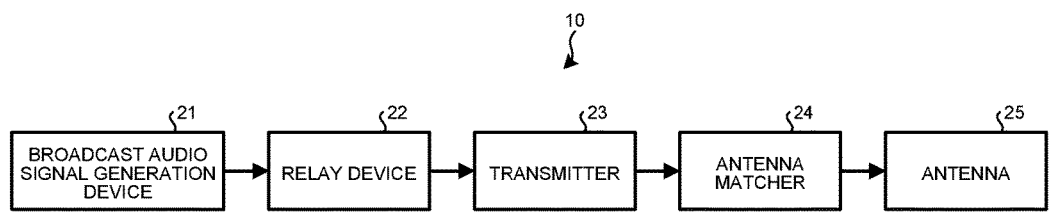
FIG. 1 is a schematic explanatory diagram of a configuration of a medium wave radio broadcast system of an embodiment.

FIG. 1 is a schematic explanatory diagram of the configuration of a medium wave radio broadcast system of an embodiment.

A medium wave radio broadcast system 10 includes a broadcast audio signal generation device 21 to generate a broadcast audio signal Sba that is audio signals for broadcasting, a continuation device 22 to relay the broadcast audio signal Sba generated by the broadcast audio signal generation device 21, a transmitter 23 to modulate the amplitude of the broadcast audio signal Sba relayed by the continuation device 22 and to output it as transmission signal, an antenna matcher 24 to match impedance between an output terminal of the transmitter 23 and an antenna 25, and the antenna 25 to emit the transmission signal being high frequency signal into a space as radio wave.

Figure 2:
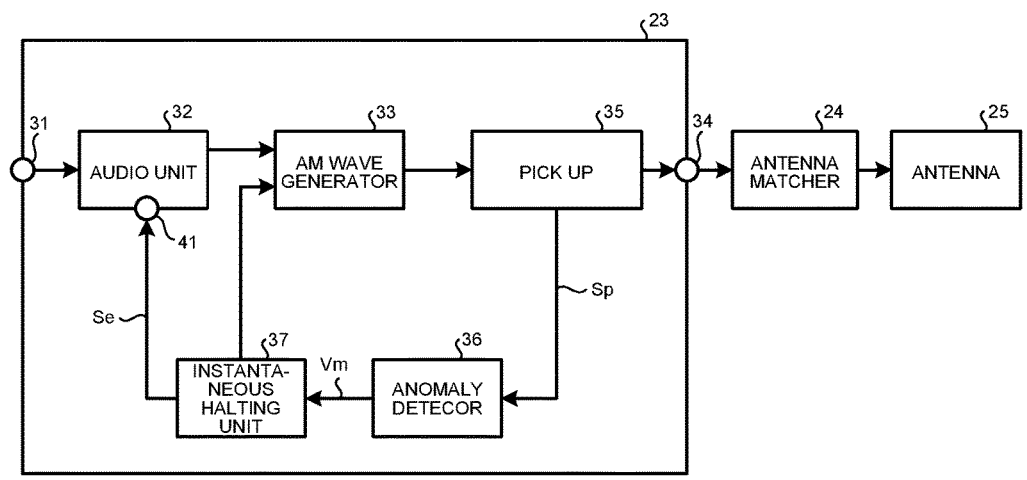
FIG. 2 is a schematic block diagram of a configuration of a transmitter according to the embodiment.

FIG. 2 is a schematic block diagram of the configuration of a transmitter.

Herein, the transmitter 23 functions as a broadcast continuation assistance device.

The transmitter 23 includes an audio unit 32 which receives the broadcast audio signal Sba generated by the broadcast audio signal generation device 21 via the continuation device 22 and an audio signal input terminal 31 and adds a time code representing a reproduction order to the broadcast audio signal Sba to store it as broadcast audio data Dba and output the broadcast audio signal in association with the time code, and an AM wave generator 33 having n power amplifiers (PAs) (not illustrated), to generate AM waves by AM modulation of carrier waves based on the broadcast audio signal output by the audio unit 32 and to output the AM waves.

The transmitter 23 includes a pickup 35 to output the AM waves output from the AM wave generator 33 without change to the antenna matcher 24 via an AM wave output terminal 34 and to pick up AM waves for detection of anomaly such as a stroke of lightning when continuance of broadcasting may cause the transmitter 23 to fail due to such anomaly, an anomaly detector 36 to detect an anomaly based on the AM waves picked up by the pickup 35 and to output an anomaly detection signal upon detection of the anomaly, and an instantaneous halting unit 37 to, upon receipt of the anomaly detection signal, control the AM wave generator 33 to halt the output, and to notify the audio unit 32 of output halting start upon the receipt of the anomaly detection signal and to notify the audio unit 32 of output halting cancellation upon no receipt of the anomaly detection signal.

The pickup 35 picks up an AM wave output from the AM wave generator 33 and measures a voltage value and a current value. The pickup 35 outputs the measured voltage value and current value to the anomaly detector 36 as pick-up signals Sp.

The anomaly detector 36 is configured as an analog circuit including an analog IC such as an operational amplifier which receives the voltage value and the current value (measured values) measured by the pickup 35 as the pick-up signals Sp. The anomaly detector 36 performs addition, subtraction, division, smoothing, or correction on the measured voltage value and current value and outputs them to the instantaneous halting unit 37 as an anomaly discrimination value Vm.

The anomaly detector 36 can calculate the anomaly discrimination value Vm from the voltage value and a voltage value different in phase by $\pi/2$ from the voltage value.

The configuration of the instantaneous halting unit 37 will be now described more specifically.

In order to block the AM wave generator 33 from outputting AM waves for a certain period of time by controlling a power amplifier (not illustrated) of the AM wave generator 33 to be into an off state from an on-controlled state based on the anomaly discrimination value Vm, the instantaneous halting unit 37 outputs the anomaly detection signal Se to the audio unit 32.

Figure 3:
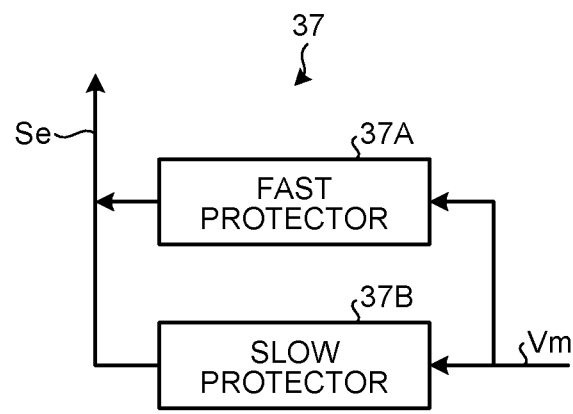
FIG. 3 is a functional block diagram of a configuration of an instantaneous halting unit according to the embodiment.

FIG. 3 is a functional block diagram of the configuration of the instantaneous halting unit.

The instantaneous halting unit 37 includes a fast protector 37A. This fast protector 37A is configured of an analog circuit for example as illustrated in FIG. 3. The fast protector 37A controls all of the power amplifiers (not illustrated) of the AM wave generator 33 to be placed into an off state from an on-controlled state based on the anomaly discrimination value Vm and outputs as the anomaly detection signal Se a first control signal PC11 which places the AM wave generator 33 in a halting state.

The instantaneous halting unit 37 further includes a slow protector 37B. This slow protector 37B is configured as a composite circuit of an analog circuit and a digital circuit as illustrated in FIG. 3. The slow protector 37B outputs as the anomaly detection signal Se a second control signal PC12 which controls all of the power amplifiers (not illustrated) of the AM wave generator 33 to be placed in the off state from the on-controlled state based on the anomaly discrimination value Vm to place the AM wave generator 33 in the halting state.

More specifically, the fast protector 37A of the instantaneous halting unit 37 is configured of an analog circuit including an analog IC such as an operational amplifier or a comparator to output to the audio unit 32 the first control signal PC11 as the anomaly detection signal Se that controls all of the on-controlled power amplifiers of the AM wave generator to be placed in the off state when the anomaly discrimination value Vm output by the anomaly detector 36 is more than or equal to a first reference value which is a preset threshold value.

The slow protector 37B of the instantaneous halting unit 37 is configured as a composite circuit of an analog circuit including an analog IC such as an operational amplifier or an A/D converter and a digital circuit such as a CPU, a CPLD, and an FPGA. The slow protector 37B outputs the second control signal PC12 as the anomaly detection signal Se to the audio unit 32.

In the above configuration, a pulse width of the first control signal PC11 output by the fast protector 37A is set to be longer than an operation delay time in the slow protector 37B configured as a composite circuit of an analog circuit and a digital circuit. This is to prevent the protection by the fast protector 37A from being cancelled before the protection by the slow protector 37B starts, that is, before the second control signal PC12 is output.

In order to determine whether the anomalous state is resolved after the second control signal PC12 is output, the slow protector 37B restarts all of the power amplifiers (not illustrated) to place them in the on state again for a short period of time and recalculates the anomaly discrimination value Vm. When the anomaly discrimination value Vm falls to or below the first reference value, the output of the anomaly detection signal Se is canceled.

The slow protector 37B further has a function to increase or decrease the anomaly discrimination value Vm when the value vm output by the anomaly detector 36 is less than or equal to the first reference value and more than or equal to the second reference value which are preset threshold values. Note that the AM wave output is not blocked during the increase or decrease operation and the anomaly detection signal Se is thus not output basically. However, with a decrease in audio volume taken into account, the anomaly detection signal Se can be output to implement broadcast continuation assistance processing. The broadcast continuation assistance processing will be described later. In this case, for example a dynamic range controlling process may be added to add a sound quality improving method. The anomaly discrimination values Vm of the fast protector 37A and the slow protector 37B may differ, however, they can be deemed equivalent for the operation since the difference is attributable to different calculation results from the same source.

Figure 4:
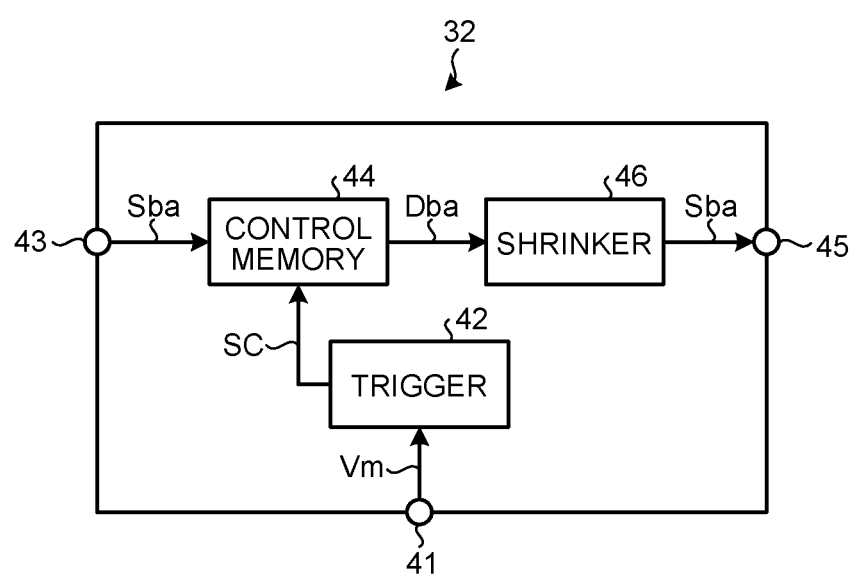
FIG. 4 is a schematic block diagram of a configuration of an audio unit according to the embodiment.

FIG. 4 is a schematic block diagram of the configuration of the audio unit.

The audio unit 32 generally includes a trigger 42, a control memory 44, and a shrinker 46.

In the above configuration, the trigger 42 receives the anomaly detection signal Se via an anomaly information input terminal 41 and outputs a control signal for the output control of the broadcast audio signal Sba based on the anomaly detection signal Se.

The control memory 44 receives the broadcast audio signal Sba via an audio signal input terminal 43, encodes the broadcast audio signal Sba, and stores it as the broadcast audio data added with a time code representing a reproduction order. The control memory 44 further sequentially outputs the broadcast audio data during normalcy, calculates silent time upon occurrence of anomaly based on the control signal output by the trigger 42, and outputs silent time data corresponding to the silent time and the broadcast audio data Dba corresponding to the silent time data.

The shrinker 46 adjusts actual reproduction time of the broadcast audio signal Sba corresponding to the broadcast audio data Dba based on the decoded broadcast audio data Dba and the silent time data for output from an audio signal output terminal 45.

Next, the operations of the embodiment will be described.

First, normal operations will be described.

The broadcast audio signal generation device 21 of the medium wave radio broadcast system 10 generates broadcast audio signals Sba as audio signals for broadcasting and outputs them to the continuation device 22.

The continuation device 22 relays the broadcast audio signals Sba generated by the broadcast audio signal generation device 21 to the audio signal input terminal 31 of the transmitter 23.

The audio unit 32 of the transmitter 23 receives the broadcast audio signals Sba from the continuation device 22 via the audio signal input terminal 31, adds a time code representing a reproduction order to the signals and stores them as broadcast audio data. In parallel with this, the audio unit 32 outputs, to the AM wave generator 33, the broadcast audio signals Sba in association with the time code.

The AM wave generator 33 performs AM modulation of carrier waves based on the broadcast audio signals Sba output by the audio unit 32 to generate AM waves and outputs them to the pickup 35.

The pickup 35 outputs the AM waves output by the AM wave generator 33 to the antenna matcher 24 via the AM wave output terminal 34. In parallel with this, the pickup 35 picks up AM waves for anomaly detection.

Thereby, the anomaly detector 36 calculates the anomaly discrimination value Vm based on the AM waves picked up by the pickup 35 and outputs the value to the instantaneous halting unit 37. However, during normal time with no anomaly detected, the instantaneous halting unit 37 does not output the anomaly detection signal Se. The AM wave generator 33 thus continues to output AM waves and the antenna matcher 24 matches impedance between the output terminal of the transmitter 23 and the antenna 25. The antenna 25 emits high-frequency transmission signals to a space as radio waves for broadcasting.

Next, operations upon anomaly will be described.

The broadcast audio signal generation device 21 of the medium wave radio broadcast system 10 generates the broadcast audio signals Sba as audio signals for broadcasting and outputs them to the continuation device 22.

The continuation device 22 relays the broadcast audio signals Sba generated by the broadcast audio signal generation device 21 to the audio signal input terminal 31 of the transmitter 23.

The audio unit 32 of the transmitter 23 receives the broadcast audio signals Sba from the continuation device 22 via the audio signal input terminal 31, adds to the signals Sba a time code representing a reproduction order, and stores them as broadcast audio data. In parallel with this, the audio unit 32 outputs, to the AM wave generator 33, the broadcast audio signals Sba in association with the time code.

The AM wave generator 33 performs AM modulation of carrier waves based on the broadcast audio signals Sba output by the audio unit 32 and thereby generates and outputs AM waves to the pickup 35.

The pickup 35 outputs the AM waves output by the AM wave generator 33 to the antenna matcher 24 via the AM wave output terminal 34. In parallel with this, the pickup 35 picks up AM waves for anomaly detection.

Thereby, the anomaly detector 36 calculates the anomaly discrimination value Vm based on the AM waves picked up by the pickup 35 and outputs the anomaly detection signal Se to the instantaneous halting unit 37 based on the anomaly discrimination value Vm.

Thus, upon receipt of the anomaly detection signal Se, the instantaneous halting unit 37 outputs the anomaly detection signal Se to the audio unit 32 and controls the AM wave generator 33 to interrupt AM wave outputs for a certain period of time.

As a result, the AM wave generator 33 stops outputting the AM waves and thus the transmission antenna 25 halts emitting the high-frequency transmission signals to a space as radio waves, thereby interrupting broadcasting.

Figure 5:
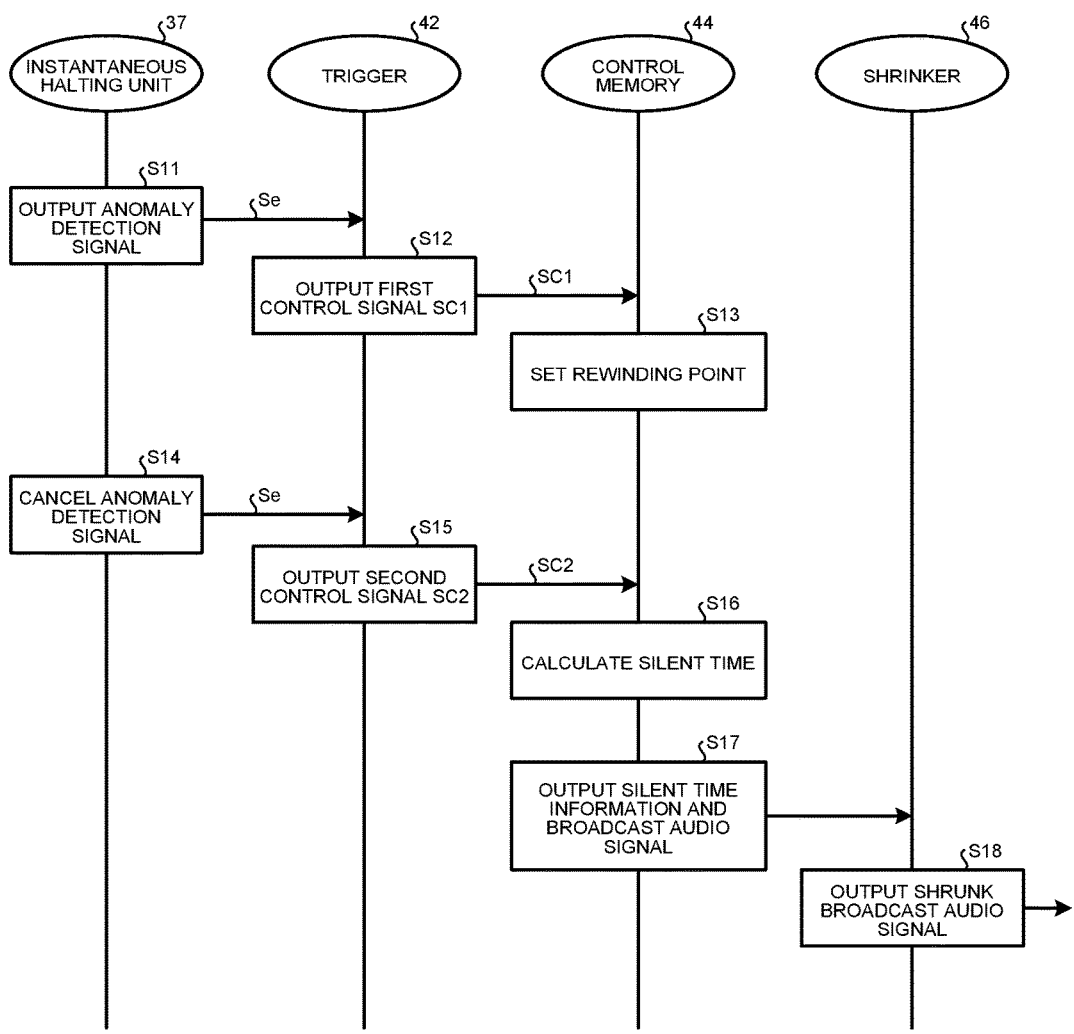
FIG. 5 is a processing sequence chart of the audio unit upon detection of anomaly according to the embodiment.

FIG. 5 is a process sequence chart of the audio unit upon detection of anomaly.

When receiving the anomaly detection signal Se from the instantaneous halting unit 37 (step S11) via the anomaly information input terminal 41, the trigger 42 of the audio unit 32 controls the output of the broadcast audio signals Sba based on the anomaly detection signal Se. More specifically, the trigger 42 of the audio unit 32 outputs, to the control memory 44 (step S12), the first control signal SC1 for setting a reproduction start point (rewinding point).

When receiving the first control signal SC1 from the trigger 42, the control memory 44 sets the reproduction start point (reproduction start time: rewinding point) (step S13).

Then, upon cancellation of the anomaly detection signal Se from the instantaneous halting unit 37 (step S14), the trigger 42 of the audio unit 32 outputs, to the control memory 44, the second control signal SC2 for processing a silent part due to anomaly detection, in response to the cancellation of the anomaly detection signal Se (step S15).

When receiving the second control signal SC2, the control memory 44 calculates a silent time (=reception time of the second control signal—reception time of the first control signal) caused by the interruption of broadcasting (step S16).

The control memory 44 then outputs, to the shrinker 46, broadcast audio data which, with no interruption of broadcasting, would otherwise have been broadcast during the calculated silent time and until the silent time elapses from the reproduction start point (reproduction start time) (step S17).

Thereby, the shrinker 46 outputs, to the AM wave generator 33, the broadcast audio signals Sba corresponding to the broadcast audio data based on the decoded broadcast audio data from the control memory 44 and the silent time data (step S18).

Figure 6:
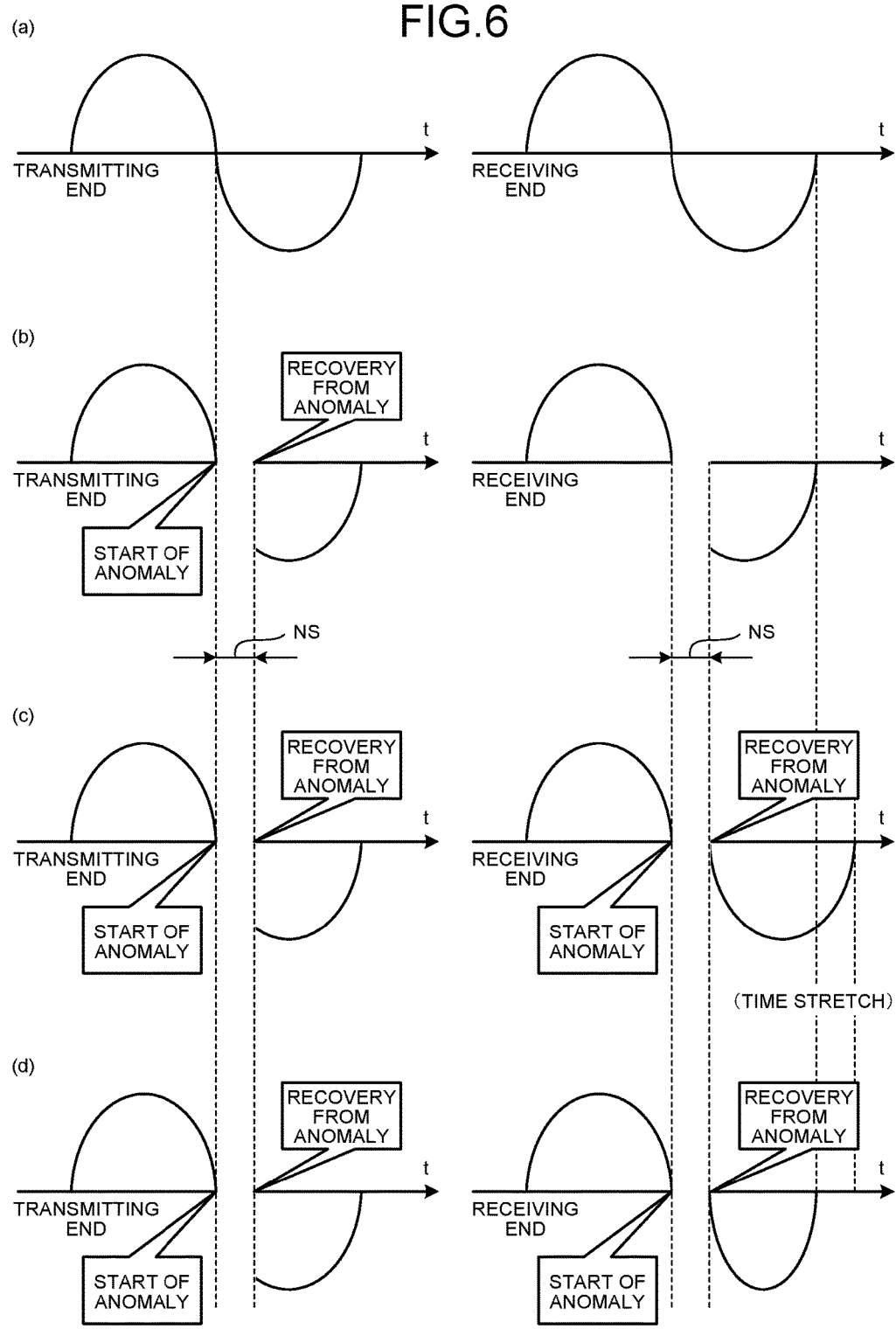
FIG. 6 is explanatory diagrams of specific operations according to the embodiment.

FIG. 6 is an explanatory diagram of specific operations.

FIG. 6(*a*) schematically presents reproduction states of the broadcast audio signals Sba at a transmitting end and a receiving end when no anomaly is detected, and occurrence of the same audio waveform.

In contrast, FIG. 6(*b*) schematically presents conventional reproduction states of broadcast audio signals Sba on a transmitting end and a receiving end upon detection of anomaly. It is seen from the drawing that the reproduced broadcast audio signals Sba is interrupted at the receiving end from occurrence of the anomaly to recovery from the anomaly at the transmitting end. Conventionally, sound is thus interrupted at the receiving end and transmitted contents are also interrupted.

In the present embodiment, as illustrated in FIG. 6(*c*), at time at which the output of the anomaly detection signal Se is canceled (anomaly recovery time), the broadcast audio signals Sba from output start time to output cancellation time of the anomaly detection signal Se are transmitted.

As a result, as illustrated in FIG. 6(*c*), although a silent interval occurs, broadcast sound is not interrupted after the transmission of the broadcast audio signals Sba, thereby implementing reliable information transmission.

Meanwhile, it is seen from the comparison between FIG. 6(*a*) and FIG. 6(*c*) that, through the simple processing as above, broadcast time is extended by a length of time corresponding to the silent time.

Actual radio broadcasting, however, includes advertisements. It is thus undesirable that a program period cut into a commercial period.

In view of this, the shrinker 46 can be configured to adjust the actual reproduction time of the broadcast audio signals Sba for output to the AM wave generator 33.

FIG. 6(d) is an explanatory diagram of adjustment of the actual reproduction time of the broadcast audio signals Sba.

The shrinker 46 here shortens only the reproduction time by so-called time stretching without changing the pitch of the broadcast sound, and reproduces the signals for a length of time obtained by subtracting the silent time from the original reproduction time.

FIG. 7 is an explanatory diagram of the relation between a program broadcasting period and a commercial broadcasting period.

As illustrated in FIG. 7(a), with no anomaly occurring, a commercial broadcasting period TB2 continues with a program broadcasting period TB1.

In such a state, when anomaly occurs during the program broadcasting period TB1 as illustrated in FIG. 7(b), a silent time NS occurs in the program broadcasting period.

Herein, it is assumed that broadcast program sound NS1 is broadcast sound which is originally scheduled to be broadcast in the silent period NS while broadcast program sound SS1 is broadcast sound which is originally scheduled to be broadcast in the broadcasting period TB1 after the silent period NS.

Continued normal broadcast under such circumstances results in missing broadcast program sound NS1. In the present embodiment, however, the broadcast program sound NS1 and the broadcast program sound SS1 are together subjected to time stretching and thereby controlled to be completely broadcast within a broadcasting period SS.

An actual program period thus falls within the original program period as illustrated in FIG. 7(c), and is prevented from cutting into the commercial period.

The broadcast program sound NS1 and the broadcast program sound SS1 are both subjected to time stretching in the above description; however, with a short silent period NS, the broadcast program sound NS1 and a part of the broadcast program sound SS1 can be subjected to time stretching. In this case, the part of the broadcast program sound SS1 can be a continuous part or discrete parts.

More specifically, a head of the broadcast program sound SS1 may be subjected to time stretching integrally with the broadcast program sound NS1. Alternatively, ends of the program broadcast sound NS1 and the broadcast program sound SS1 may be integrally subjected to time stretching. Alternatively, the respective multiple parts of the broadcast program sound NS1 and the broadcast program sound SS1 may be integrally subjected to time stretching.

When the silent time period NS is long and time stretching of the program period causes too much auditory discomfort, a part of the broadcast program sound NS1 can be deleted (usually a head part) and the remaining part of the broadcast program sound NS1 and the broadcast program sound SS1 can be subjected to the processing (time stretching) in the program period in the same manner.

In such a configuration, the reproduction start point coincides with anomaly detection timing, and hence does not always fall at a phonetically appropriate point. Specifically, it may come at the middle of a word (for example a reproduction start time of the "r" sound of the word "broadcast") or during reproduction of one sound (for example during reproduction of the "e" sound of the word "speech"). In such a case, it is possible to extract the head of a word or the head of a sound by sound recognition, for example and transmit the broadcast audio data from time corresponding to a phonetically appropriate separating point prior to the reproduction start point.

As a result of the above, the control memory 44 of the audio unit 32 outputs, to the AM wave generator 33, the broadcast audio signals Sba output within a period from the anomaly detection to the end of the anomaly detection.

This allows the AM wave generator 33 to generate AM waves again by the AM modulation of carrier waves based on the broadcast audio signals Sba output by the audio unit 32, and to output them to the pickup 35. The pickup 35 outputs the AM waves output by the AM wave generator 33 to the antenna matcher 24 via the AM wave output terminal 34.

The antenna matcher 24 matches impedance between the output terminal of the transmitter 23 and the antenna 25. The antenna 25 emits high-frequency transmission signals to a space as radio waves and continues to broadcast again.

As described above, according to the present embodiment, even when a silent state occurs in the case of anomaly such as a stroke of lightning (AM wave output is blocked for a short period of time), the suppression of missing information can inhibit a listener from being affected by the silent state, for example.

Next, modification of the embodiment will be described.

In the above descriptions, the trigger 42 outputs the first control signal SC1 and the second control signal SC2 to the control memory 44 based on the anomaly detection signal Se from the instantaneous halting unit 37; however, the trigger 42 can be omitted and the control memory 44 can be configured to output and cancel the output of the anomaly detection signal Se, the first control signal SC1, and the second control signal SC2 in the same manner.

In the above descriptions, the audio unit 32 of the transmitter 23 functions as the broadcast continuation assistance device; however, the broadcast audio signal generation device 21 or the continuation device 22 can be configured to have the same or like functions (functions of the trigger 42, the control memory 44, and the shrinker 46). In this case, the instantaneous halting unit 37 of the transmitter 23 is required to feed back the signals to the broadcast audio signal generation device 21 or the continuation device 22.

The above descriptions do not include how to discriminate the program broadcasting period and the commercial broadcasting period. For example, a pilot signal may be superimposed on the broadcast audio signal Sba. In this case, for example, the pilot signal of a single tone may be used and added to a frequency other than audible frequencies (e.g. 7.5 kHz or more).

The above descriptions have exemplified a configuration that a commercial broadcasting period is not subjected to anomaly handling. However, the above processing may not be performed, for example, to a broadcast period where the processing of broadcast sound may induce a copyright issue (e.g. music broadcasting period) or a broadcast period where processing to content is prohibited by law and content is required to be broadcast as it is (e.g. election broadcasting period).

The broadcast continuation assistance device of the present embodiment includes a control device such as a CPU and a memory device such as a read only memory (ROM) or a RAM and thus can have a hardware configuration using a general computer.

A control program executed in the broadcast continuation assistance device of the present embodiment can be stored and provided in an installable or executable file format on a computer-readable recording medium such as a CD-ROM, a flexible disc (FD), a CD-R, and a digital versatile disk (DVD).

Furthermore, the control program executed in the broadcast continuation assistance device of the present embodiment may be stored in a computer connected to a network such as the Internet and provided by download via the network. Moreover, the control program executed in the broadcast continuation assistance device of the present embodiment may be provided or distributed via a network such as the Internet.

Furthermore, the control program of the broadcast continuation assistance device of the present embodiment may be incorporated into a ROM or the like in advance.

The control program executed in the broadcast continuation assistance device of the present embodiment has a module configuration including the aforementioned respective units or elements (memory, output unit, . . . ). As actual hardware, a CPU (processor) reads the control program from the recording medium and executes the control program, thereby allowing the respective units or elements to be loaded on a main memory device. The memory, the output unit, . . . are thus generated on the main memory device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A broadcast continuation assistance device, comprising:
    a memory that stores broadcast audio data corresponding to input broadcast audio signals in a chronological order; and
    an output unit that receives an anomaly detection signal during an anomaly detection period, reads, from the memory, the broadcast audio data corresponding to the broadcast audio signals stored in the memory during the anomaly detected period by lightning energy, and transmits, as radio signals, the broadcast audio signals corresponding to the read broadcast audio data after an anomaly is resolved.

2. The broadcast continuation assistance device according to claim 1,
    wherein the output unit reads the broadcast audio data corresponding to the broadcast audio signals stored in the memory during the anomaly detected period and a period subsequent to the anomaly detected period, and outputs the broadcast audio signals corresponding to the read broadcast audio data after the anomaly is resolved.

3. The broadcast continuation assistance device according to claim 1,
    wherein the output unit reads the broadcast audio data corresponding to the broadcast audio signals broadcast during the anomaly detected period and a period immediately before the anomaly detected period, and outputs the broadcast audio signals corresponding to the read broadcast audio data after the anomaly is resolved.

4. The broadcast continuation assistance device according to claim 1,
    wherein the output unit completes outputting of all the broadcast audio signals read from the memory corresponding to the broadcast audio data, by timing at which with no detection of anomaly, the outputting would have completed.

5. The broadcast continuation assistance device according to claim 4,
    wherein the output unit completes the outputting by time stretching of the broadcast audio signals by the timing at which with no detection of anomaly, the outputting would have completed.

6. The broadcast continuation assistance device according to claim 1,
    wherein, of the broadcast audio signals, the broadcast audio signals to be processed by the output unit are distinguishable, and
    the output unit reads the broadcast audio data corresponding to the broadcast audio signals to be processed, and outputs the broadcast audio signals to be processed.

7. The broadcast continuation assistance device according to claim 6,
    wherein the broadcast audio signals include a superposed pilot signal, and
    the output unit distinguishes the broadcast audio signals to be processed based on the pilot signal.

8. A control method for a broadcast continuation assistance device, the method executed in a broadcast continuation assistance device comprising a memory to store broadcast audio data, the method comprising:
    storing, in a chronological order, broadcast audio data corresponding to broadcast audio signals input to the memory;
    receiving an anomaly detection signal during an anomaly detected period by lightning energy; and
    reading, from the memory, the broadcast audio data corresponding to the broadcast audio signals stored during the anomaly detected period, and transmitting, as radio signals, the broadcast audio signals corresponding to the read broadcast audio data after an anomaly is resolved.

9. A computer program product including programmed instructions embodied in and stored on a non-transitory computer readable medium, wherein the instructions, when executed by a computer, cause the computer to perform:
    storing, in a chronological order, broadcast audio data corresponding to broadcast audio signals input to a memory; and
    receiving an anomaly detection signal during an anomaly detection period by lightning energy, and
    reading, from the memory, the broadcast audio data corresponding to the broadcast audio signals stored during the anomaly detected period, and transmitting, as radio signals, the broadcast audio signals corresponding to the read broadcast audio data after an anomaly is resolved.

* * * * *